United States Patent Office 2,908,614
Patented Oct. 13, 1959

2,908,614

USE OF DEXTRAN IN FREEZE-DRYING PROCESS

Peter William Muggleton, Harrow, and Joseph Ungar, Pinner, England, assignors to Glaxo Laboratories Limited, Greenford, England, a British company No Drawing. Application July 29, 1955
Serial No. 525,392

Claims priority, application Great Britain August 10, 1954

17 Claims. (Cl. 167—78)

This invention is concerned with improvements in or relating to the freeze-drying of sensitive materials particularly biological products.

The drying of many such materials can present difficulties where the nature of the material is such that it is destroyed or damaged by ordinary drying operations; in such cases the operation of freeze-drying is frequently carried out which is a method of drying which is one of the least likely to cause damage to the material to be dried. The method involves the freezing of the material to be dried, which may be a solution, suspension or merely a wet product, followed by the direct sublimation of the ice in vacuo.

This invention is concerned with the freeze-drying of materials which are liable to destruction by ordinary drying operations but can be freeze-dried; such materials are hereinafter referred to as "sensitive materials of the kind referred to" and include particularly sensitive biological materials, such as living or killed organisms (for example bacteria or viruses) enzymes, hormones, organ extracts and the like.

Examples of preparations which give rise to difficulties on drying are vaccines. Thus for example, a major problem in connection with vaccination with the bacillus of Calmette and Guerin (B.C.G. vaccination) is that of securing a vaccine containing a sufficient number of viable organisms at the time of inoculation. Up to the present time, most of the vaccination has been carried out with aqueous suspensions of such bacilli which, due to a rapid loss of viability, have to be discarded after about 2 weeks. Thus for example, the export of the suspended vaccine has therefore only limited possibilities because the distribution to clinics and doctors has to be rapid. Another important drawback of the vaccine is the fact that the product is injected before its efficacy, degree of viability and freedom from contaminants are estimated. Similar difficulties are well-known to occur with other biological products.

The process of freeze-drying has frequently been proposed to reduce the disadvantages mentioned above in connection with B.C.G. vaccine and advantages have been obtained provided that the freeze-drying is carefully carried out. Thus, for example, in the freeze-drying of vaccines containing viable organisms, e.g. B.C.G. vaccine, the degree of survival of the bacteria during the freeze-drying has been found to be to a great extent dependent on the nature of the medium in which the bacterial cells are suspended for drying. Thus for example in the case of B.C.G. vaccine it has previously been proposed to freeze-dry the organisms in horse serum, gelatine solution, glucose solution, lactose solution, denatured gelatine suspension and in solutions of other substances such as gum acacia and milk. In research work we have carried out we have found that many of the hitherto suggested drying media have certain disadvantages. Thus, for example, the objection to animal proteins is that they have anaphylactogenic properties and may therefore cause untoward reactions in the person where the product is intended for injection. If human serum were used instead of horse, this criticism would not apply but on the other hand there exists the slight risk of such a product containing hepatitis virus. The low molecular weight sugars (glucose, lactose) have none of these objections but do have the technical disadvantage that they are singularly retentive of water thus making the freeze-drying procedure more hazardous to sensitive materials. Moreover, many drying agents such as glucose, when freeze-drying is proceeding, "thaw out" and make a very ugly product.

We have now found that aqueous dextran forms a particularly advantageous medium for the freeze-drying of sensitive materials of the kind referred to. As is well-known dextran is a high molecular weight poly-saccharide which is produced, for example on the fermentation of a number of species of the genus Leuconostoc in a sucrose-containing medium.

The use of dextran is advantageous for the following reasons:

(a) It can be sterilised by autoclaving and is quite stable (cf. serum protein which has to be sterilised by filtration).

(b) In general it gives just as good protection to sensitive materials as any freeze-drying medium hitherto proposed.

(c) In general, it gives a good product which may be readily reconstituted by the addition of water forming a solution or suspension without visible clumping.

The use of a dextran solution as a medium for freeze-drying biological products is particularly advantageous in the drying of vaccines, hormones, virus suspensions and the like. We find that particularly useful results are obtained in the drying of vaccines using aqueous dextran as the drying media and that many of the disadvantages of other media are considerably reduced. In the case of vaccines containing viable organisms, it is in addition found that the resulting preparations have a particularly long life and are more readily tested before use, thus avoiding a major danger attendant upon, for example liquid vaccines.

Accordingly the invention comprises a method of freeze-drying sensitive materials of the kind referred to in which the sensitive material to be dried is admixed with an aqueous dextran solution and the resultant mixture is freeze-dried.

According to a feature of the invention the sensitive material to be freeze-dried are living or killed organisms particularly living or killed bacteria or viruses, or enzymes.

According to yet a further feature of the invention the material to be dried is a vaccine, particularly one containing bacilli of the type of Calmette and Guerin.

As is well known polysaccharides described by the term "dextran" may have widely varying molecular weights and thus for pharmaceutical use, for example as blood plasma substitutes, it is common to fractionate a specimen of dextran to separate therefrom a fraction of a specific molecular weight range. In particular the injection of molecules of very high molecular weight may be undesirable. For the purpose of the present invention we prefer to use a dextran having a molecular weight range of from 10,000 to 100,000, advantageously 30,000 to 50,000. Thus for example good results have been achieved in the freeze-drying of vaccines by the use of a sample of dextran having a molecular weight of approximately 30,000.

The dextran employed should desirably be salt-free. We prefer that the aqueous material to be dried should contain from 1 to 10% w./v. of dextran; the use of less than 1% tends to give inferior results whilst the use of more than 10% renders the aqueous material rather too viscous for convenient handling. Thus for example we have found that in the drying of vaccines the addition of 6% of dextran to the aqueous material to be dried gives good results.

In order as far as possible to avoid clumping or aggregation of the dried product on resuspension or resolution in water it is preferable that the suspension or solution to be freeze-dried should also contain a compatible wetting agent. Where the product is intended for administration in medicine the wetting agent should be non-toxic, by which we mean that the wetting agent should produce no toxic effects on administration of the vaccine. By "compatible" we mean that the wetting agent should not interfere with the quality of the product to be dried. Many wetting agents contain free fatty acids or are unstable giving free fratty acids in aqueous solutions and since fatty acids are for example lethal to many organisms, particularly B.C.G., such wetting agents would be unsuitable for the drying of viable vaccines. The wetting agent to be used therefore should be stable, free from fatty acid and not in itself detrimental to the product to be dried. In general non-ionic wetting agents are preferred.

We have found that the polyoxyethlene ether class of wetting agent provides suitable substances for use and for example the wetting agent known under the trade name Triton W.R. 1339 has been found to be particularly suitable in the preparation of freeze-dried B.C.G. vaccines. For example 1 part of this wetting agent in 4000 parts of suspension produces good results.

The freeze-drying operation itself can be carried out in any convenient manner; thus the material to be dried many be placed in suitable containers which are cooled to a low temperature, e.g. by the use of a solid $CO_2$/acetone bath until the aqueous material is thoroughly frozen. The containers are then evacuated to a very low pressure and water is vaporised at such a rate that the residue in the containers remains frozen. The process is continued if necessary with increase of vacuum until the desired residual moisture content is achieved.

It should be noted that in the preparation of freeze-dried vaccines from living organisms, e.g. B.C.G., it is possible to dry the product too completely and so kill the organism of which it is essential to leave a sufficient number alive. On the other hand, it is not permissible to leave too much water in the freeze-dried product or deterioration (loss of viability) on storage will ensue. It is thus desirable to dry the vaccine to such an extent that it is as dry as possible but not so dry that substantial loss of viability takes place.

The amount of residual moisture in the product is controlled by (a) the efficiency of the freeze-drying apparatus (i.e. the condenser temperature and efficiency of the vacuum), (b) by the processing time and (c) by the nature of the drying medium. The use of dextran according to the invention makes it particularly easy to "over-dry" the product and it is convenient to control the amount of residual moisture by incorporating, in the dextran medium, some inert substance which strongly retains water e. g., glucose which, in suitable concentration, will enable the optimum amount of moisture to be retained under the particular drying conditions employed. Thus for example with a vacuum of 0.05–0.1 mm./Hg and a condenser temperature of −70° C., we have found by means of experiments that about 7.5% glucose, added to 10% dextran solution gives the optimal retention of viability. The optimum quantity of glucose for other conditions can readily be determined by experiment as will be clear to those skilled in the art.

It is also possible to retain the required amount of residual moisture of a vaccine containing dextran only (no glucose) as the drying medium by stopping the drying when the optimal water content is reached. However, analytical control of the product and control of the apparatus may be too cumbersome for this to be practicable and the alternative method above referred to is preferable. The fact that the use of dextran as drying media enables materials of particularly low moisture content to be obtained is however highly desirable in many cases, e.g. in the case of vaccines which do not contain viable organisms.

In order that the invention may be well understood, the following examples are given only as illustrations:

EXAMPLE 1

*Freeze-drying of B.C.G. vaccine*

A predetermined number of viable B.C.G. organisms is collected from a suspension in physiological saline, culture medium or other aqueous liquid by centrifuging. The cells are then resuspended in a 6% w./v. solution of dextran in 5% aqueous glucose solution containing 1/4000 Triton W.R. 1339. Sufficient solution is added to give a known number of bacteria per ml. The suspension is then filled into suitable containers (e.g. ampoules) which are cooled until the suspension freezes. While still frozen, the ampoules are transferred to a freeze-drying machine where, under a pressure of 0.05–0.1 mm./Hg and a condenser temperature of −70° C., water is vaporised from the frozen suspension at such a rate that it remains frozen. The process is continued, if necessary, by transferring in the latter stages to a more efficient vacuum system until the remaining moisture content is very low (less than 0.5% by weight). The ampoules are then sealed in vacuo or after being filled with an inert gas (e.g. nitrogen). Not less than 10% of the B.C.G. cells should survive the freeze-drying process.

EXAMPLE 2

*Freeze-drying of killed bacterial vaccines (e.g. H. pertussis vaccine)*

Cells of *H. pertussis*, killed by some acceptable means (e.g. treatment with sodium ethyl mercury thiosalicylate, formalin, heat, etc.) are collected in a centrifuge and resuspended in a solution of 6% w./v. dextran in physiological saline. The suspension, after standardisation to a required number of cells/ml. is filled into suitable containers (vials, ampoules, etc.) and, after pre-freezing, is freeze dried in the same way as for the B.C.G. vaccine.

EXAMPLE 3

*Freeze-drying of viruses*

A concentrated suspension of influenza virus is prepared by a convenient method (e.g. from egg cultures or from a homogenate of lung of a mouse previously infected with the virus). To this concentrated suspension is added 3 volumes of a solution consisting of 10% dextran with 6% glucose and the fluids are mixed. The suspension is then filled into suitable containers (e.g. 2 ml. ampoules) and frozen in a deep-freeze machine at −60° C. While still frozen, the ampoules are transferred to a freeze-drying machine where the process of freeze-drying is continued as described in Example 1. The survival of the virus particles during the freeze-drying process is shown by their ability to infect fertile hens' eggs or mice after reconstitution of the virus suspension with water.

Other species of virus which are dried in the manner described in this example include viruses of the encephalitis group, psittacosis virus and herpes simplex virus.

EXAMPLE 4

*Freeze-drying of enzymes*

The enzyme deoxyribonuclease is isolated from culture filtrates of certain strains of *Streptomyces albus* by classical techniques. The enzyme, in impure state, is rapidly destroyed on storage in solution and is therefore conveniently kept freeze-dried.

To the crude culture filtrate containing deoxyribonuclease is added dextran powder to give a 5% w./v. solution. The dextran is dissolved by gentle shaking so as to avoid foaming (which might cause inactivation of the enzyme) and the solution is transferred to a suitable container, e.g. a round-bottomed flask and frozen at −60° C. in a deep freeze. The flask, containing the still-frozen solution is attached to a freeze-drying machine. Freeze-drying is then carried out as in Example 1 to give a dried product having a moisture content of 0.5% and containing active enzyme.

This method has also been employed with solutions of crude or purified proteinase, peptidase and ribonuclease.

EXAMPLE 5

Freeze-drying of Streptomyces griseus spores 70 ml. of a sporulated culture of *Streptomyces griseus* are diluted with 10 ml. of a sterile solution (4% w./v.) of crude, undegraded bacterial dextran so that the final dextran concentration is 0.5% w./v. This mixture is filled into sterile ampoules in 2.5 ml. amounts. The ampoules are rapidly frozen by immersion in a mixture of light petroleum and solid carbon dioxide and dried in a desiccator under a vacuum of 50$\mu$ Hg for 48 hours. Dry nitrogen is admitted to the desiccator, the cotton-wool plugs are pushed down and a second drying effected over phosphorus pentoxides under a vacuum of 50$\mu$ Hg for four days. Finally, dry nitrogen is again admitted to the desiccator before sealing the ampoules.

We claim:

1. In a method of drying a sensitive biological product in which said product of the class consisting of living organisms, killed organisms, enzymes, hormones and organ extracts is incorporated in an aqueous protective medium, said medium is frozen and ice is directly sublimed in vacuo, the step of uniformly incorporating said sensitive biological product in an aqueous dextran solution as said protective medium.

2. The method of claim 1 in which said dextran has a molecular weight range substantially within the range of from 10,000 to 100,000.

3. The method of claim 1 in which said dextran has a molecular weight range substantially within the range of from 30,000 to 50,000.

4. The method of claim 1 in which said dextran solution contains 1% to 10% w./v. of dextran.

5. The method of claim 1 in which glucose is also added to said aqueous medium prior to freezing whereby the moisture content of the final product may be controlled.

6. The method of claim 1 in which said biological product is a vaccine.

7. The method of claim 6 in which said vaccine comprises viable organisms of the type of Calmette and Guerin.

8. The method of claim 6 in which said vaccine comprises dead cells of the organism *H. pertussis*.

9. The method of claim 1 in which a compatible polyoxyethylene ether wetting agent is also added to said aqueous medium prior to freezing.

10. A biological preparation comprising a freeze-dried mixture of dextran and a sensitive biological product of the class consisting of living organisms, killed organisms, enzymes, hormones and organ extracts.

11. The biological preparation of claim 10 in which said dextran has a molecular weight range substantially within the range of from 10,000 to 100,000.

12. The biological preparation of claim 10 in which said dextran has a molecular weight range substantially within the range of from 30,000 to 50,000.

13. The biological preparation of claim 10 in which said sensitive biological product is a vaccine.

14. The biological preparation of claim 13 in which said vaccine comprises viable organisms of the type of Calmette and Guerin.

15. The biological preparation of claim 13 in which said vaccine comprises dead cells of the organism *H. pertussis*.

16. The biological preparation of claim 10 which also contains a compatible polyoxyethylene ether wetting agent.

17. The biological preparation of claim 10 which also contains glucose whereby the moisture content of said preparation is controlled.

References Cited in the file of this patent

UNITED STATES PATENTS

| 2,602,082 | Owen | July 1, 1952 |
| 2,642,376 | Gale | June 16, 1953 |

FOREIGN PATENTS

| 121,751 | Sweden | May 25, 1948 |

OTHER REFERENCES

Ungar: The Med. Press, May 5, 1954, pp. 3–18.
Kabat et al.: Jour. of Immuno., June 1953, pp. 514–532.
Owen: Sugar, August 1948, pp. 28 and 29.
Proom: J. Gen. Microbiol., 1949, vol. 3, pp. 7, 8, 11 and 16–18.
Squibb Abst., January 31, 1951, vol. 24, p. A–94.
Fletcher: Nature, August 23, 1952, p. 319.
Bauer et al.: Proc. Soc. Exp. Biol. and Med., vol. 87, November 1954, No. 2, pp. 341–343 (pub. March 29, 1954).